United States Patent [19]

Nozaki et al.

[11] 4,400,775

[45] Aug. 23, 1983

[54] SHARED SYSTEM FOR SHARED INFORMATION AT MAIN MEMORY LEVEL IN COMPUTER COMPLEX

[75] Inventors: Masaharu Nozaki, Fuchu; Hiroshi Nakamura, Kunitachi; Yusaku Miki, Fuchu, all of Japan

[73] Assignee: Tokyo Shibaura Denki Kabushiki Kaisha, Kawasaki, Japan

[21] Appl. No.: 238,657

[22] Filed: Feb. 26, 1981

[30] Foreign Application Priority Data

| Feb. 28, 1980 [JP] | Japan | 55-24413 |
| Feb. 28, 1980 [JP] | Japan | 55-24414 |
| Feb. 28, 1980 [JP] | Japan | 55-24415 |

[51] Int. Cl.³ .............................................. G06F 15/16
[52] U.S. Cl. ................................................. 364/200
[58] Field of Search ................. 371/9, 10; 364/200, 364/900

[56] References Cited

U.S. PATENT DOCUMENTS

| 3,286,239 | 11/1966 | Thompson et al. | 364/200 |
| 3,828,320 | 8/1974 | Dinerman et al. | 364/200 |
| 3,950,729 | 4/1976 | Fletcher et al. | 364/200 |
| 4,123,794 | 10/1978 | Matsumoto | 364/200 |
| 4,191,996 | 3/1980 | Chesley | 371/10 |
| 4,210,960 | 7/1980 | Borgerson et al. | 364/200 |
| 4,219,873 | 8/1980 | Kober et al. | 364/200 |

Primary Examiner—Mark E. Nusbaum
Assistant Examiner—Michael R. Fleming
Attorney, Agent, or Firm—Cushman, Darby & Cushman

[57] ABSTRACT

A computer arrangement for facilitating the sharing of information among computers at a memory level. Each computer includes means for accessing the main memory of another computer of the complex at machine word level, means for transmitting an interruption instruction from itself to the arithmetic control unit of the other computer, means for detecting a problem in the arithmetic control unit of itself, and means for altering one section of the logic address viewed from itself to some of a plurality of physical address spaces such as to make the same the logic address of a shared information storage region of the computer complex viewed from the program of each of the member computers. Shared information required for each computer is stored in its own main memory. When a problem occurs in the computer having the aforesaid shared information storage region it becomes evident in the computer's arithmetic control unit. As a result, an interruption instruction is sent to each of the other computers. The computers receiving the interruption permit the shared information stored in their own main memories to be transferred through the access enabling means to the main memories of the other computers to be written therein thereby restoring the shared information storage region, and permitting continual data processing.

4 Claims, 32 Drawing Figures

CHANNEL COUPLING DEVICE

SHARED SYSTEM FOR SHARED INFORMATION AT MAIN MEMORY LEVEL IN COMPUTER COMPLEX

BACKGROUND OF THE INVENTION

This invention relates to a computer complex including a plurality of computers operatively linked to one another for data processing. More specifically, the present invention is directed to improvements in the arrangement of the computers to facilitate the sharing of information among computers at their main memory levels.

FIG. 1 shows a prior art example of a shared system for shared information in a computer complex. In this system, element computers 2 and 4 are coupled to each other through channel linkage units 6 and 8, etc. for the shared information to be universally stored in them. Through the channel linkage units 6 and 8 the shared information can be transferred between the computers 2 and 4. In this system where the information are shared in the computers 2 and 4, to permit access to the shared information it is necessary to interrupt the channel linkage. Further, where information that is the same as the shared information is stored in each of the computers, it is necessary to interrupt to the channel linkage in accordance with the alternation of the contents of the shared information. In the system shown in FIG. 1, a great deal of overhead is required to produce the required interruption to the channel linkage. This creates a problem from the standpoint of the reliability of the system as a whole.

FIG. 2 shows another prior art system example. In this case, individual element computers 10, 12 and 14 are connected to a shared memory 16, in which the shared information is stored and to which access can be made from the individual computers at the instruction word level. In this system, however, a problem in shared memory 16 leads to a fault of the entire computer complex so that a problem arises from the standpoint of the reliability of the system as a whole. To avoid this, the shared memory 16 itself may be constructed to have a twofold construction. Doing so, however, causes an increase in system cost.

FIG. 3 shows a further prior art system in which a plurality of arithmetic control units 18, 20 and 22 and a plurality of main memory units 24 and 26 are mutually coupled together, and shared information is stored in the main memory units 24 and 26. In this system, the physical address space of the individual main memories 24 and 26 when viewed from each of the arithmetic control units 18, 20 and 22 is the same, and the system can thus be regarded to be equivalent to a system as shown in FIG. 4, where a plurality of arithmetic control units 18, 20 and 22 are connected to a single large main memory 28 which is banked to meet the number of main memories 24 and 26. Therefore, contention in making access to the main memories 24 and 26 from the individual arithmetic control units is likely to result.

Meanwhile, in computer networks shared information is not held for access at the main memory level in the individual computers but, each computer independently holds information regarding the state of computer complex. The information about the computer complex state is altered when phenomena occurring in one computer is notified to the other computers. In this case, it is necessary for the computer complex to have a great deal of overhead for providing such notification of.

In a further aspect, the arrangement where the shared information in the computer complex is held in a single place and that where the shared information is held in a plurality of places have their own merits and demerits. Where the shared information is preserved in a single place, a problem of the element in which the shared information is preserved leads to a fault of the whole computer complex. On the other hand, where the shared information is preserved in a plurality of places, extra time and cost are required for the increased complexity.

Meanwhile, provision of a twofold shared memory in the example of FIG. 2 to cope with the system-down leads to cost increase as mentioned earlier.

In either case, it is difficult to provide a high performance-cost ratio computer complex, which is capable of continuing its data processing even when a problem occurs in the element storing the shared information.

SUMMARY OF THE INVENTION

This invention provides an arrangement for overcoming the drawbacks discussed above. Its primary object is to provide a system for permitting universal preservation of shared information in a computer complex, which assures high performance cost ratio and is capable of continuing data processing even in the event of a problem in the element storing the shared information.

To achieve this objective, there is provided a shared system for shared information at a main memory level in a computer complex, which comprises a plurality of computers each including a main memory for storing at least local information, a main memory control section for controlling the main memory and an arithmetic control unit having an arithmetic control section and operatively coupled to one another for data processing, the main memory of one of the element computers being provided with a shared information storage region, which shared system for shared information comprises means for enabling access from one of the computers to the opposite one thereof at a machine word level, means for transmitting an interruption from the self computer to the arithmetic control unit of the opposite computer, means for detecting a trouble in the arithmetic control unit of the self computer, high speed input/output bus means connecting the access enabling means and interruption transmitting means, and means for altering one section of the logic address space viewed from the self computer to some of a plurality of physical address spaces such as to make the same the logic address of the shared information storage region viewed from the program of each of the computers, wherein shared information required for each computer is stored in the main memory of the self computer to recover the contents of the shared information storage area in the computer complex and, when a trouble in the computer possessing the shared information storage region is detected by the trouble detection means an interruption is sent from the interruption transmitting means to each of the other computers for permitting the writing of the shared information stored in the main memory of the self computer to the main memories of the other computers through the access enabling means and thereby restoring the shared memory storage region for continuing the processing being in force.

According to the invention, access to the opposite computer main memory can be made at the machine word level, and thus less overhead is involved in obtaining access to the shared information. In addition, with independent main memories provided in the respective computers, it is possible to reduce contention among computers by permitting each computer to make access to its own main memory for local information. Further, since it is possible to make the logic address of the computer complex global region the same when viewed from the program of each computer, the program can be readily prepared. Still further, since the computer complex global region which stores the shared information can be dynamically shifted to a desired computer and it is possible to restore shared information at the time of occurrence of a problem in the computer where the global region is formed, it is possible to continue data processing by the computer complex as a whole even when a problem occurs in the computer having the global region. Yet further, a computer's overhead at the time of altering the shared information for restoration thereof is required only for holding information in its own main memory. There is no overhead required for access made to the main memory of the other computers, so that less overhead is required compared to a system which has a plurality of copies of the shared information. Furthermore, since address spaces which can be made access to from each computer by merely providing each computer with hardware for making access to the opposite computer main memory, no special shared information memory is needed.

DETAILED DESCRIPTION OF THE PREFERRED EMBODIMENTS

Figure 1:
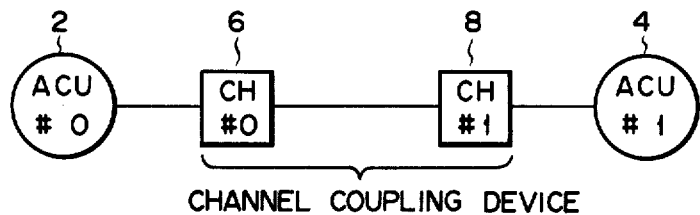
FIGS. 1 through 4 are block diagrams showing prior art examples of the shared system for shared information.
Figure 2:
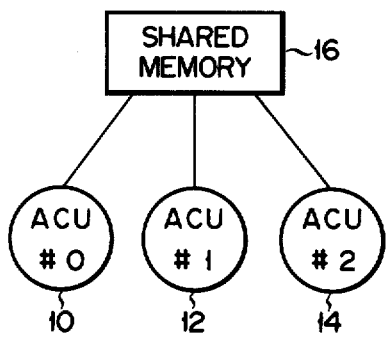
Figure 3:
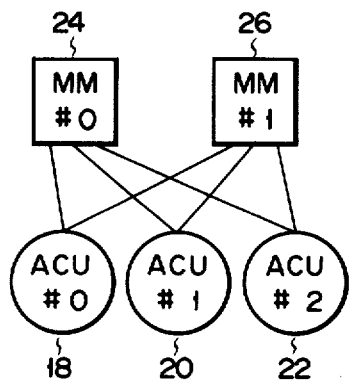
Figure 4:
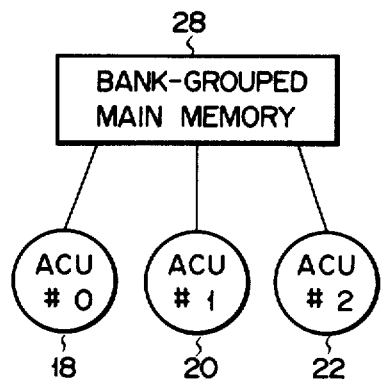
Figure 5:
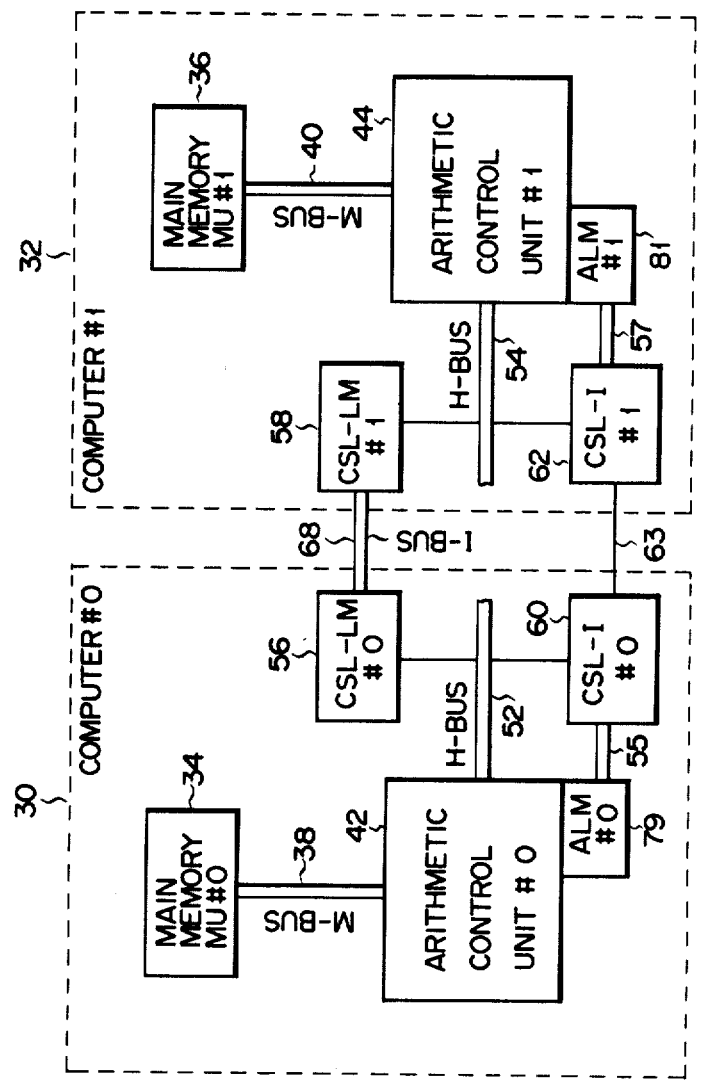
FIG. 5 is a block diagram showing an embodiment of the invention.

FIG. 5 shows a schematic block diagram of a computer complex embodying the invention. In the Figure, a computer complex which comprises only two computer systems for simplifying the description. Computer #0 is designated by reference numeral 30 and computer #1 is designated by reference numeral 32.

Figure 6:
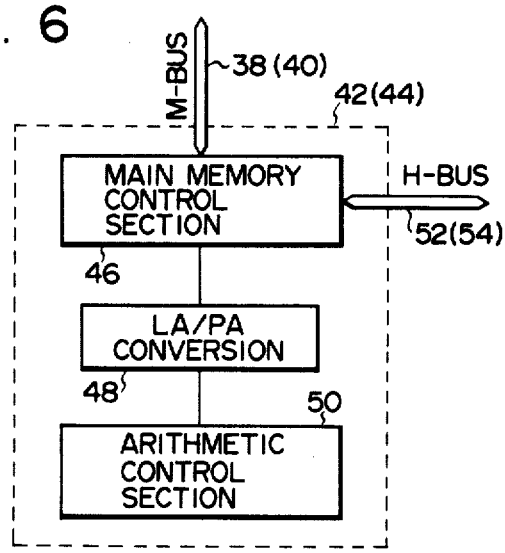
FIG. 6 is a block diagram showing an arithmetic control unit.

The computers 30 and 32 include respective main memory units (hereinafter referred to as MU) 34 and 36 accommodating programs and other data. These MUs 34 and 36 are respectively connected through memory buses (hereinafter referred to as M-BUS) 38 and 40 to arithmetic control units (hereinafter referred to as ACU) 42 and 44 which perform various operations such as comparison of data, arithmetic operations and decision. The ACU 42 (or 44), as shown in FIG. 6, has a main memory control section 46 for controlling the reading data from and writing data in the MU 34 (or 36), an LA/PA conversion section 48 for converting logic address into physical address and an arithmetic control section 50 for controlling various data processing operations. The ACUs 42 and 44 are respectively connected through high speed buses (hereinafter referred to as H-BUS) 52 and 54 to computer system linkage local memory circuits (hereinafter referred to as CSL-LM) 56 and 58 for exchanging shared information with one another and also to computer system linkage interrupt circuits (hereinafter referred to as CLS-I) 60 and 62 for exchanging information with one another and producing an interruption with respect to the other system computer. Between the arithmetic control units 42 and 44 on one hand and the CSL-Is 60 and 62 on the other hand, respective alarm units (hereinafter referred to as ALM) 79 and 81 for detecting system-down and alarming the units 42 and 44 thereof.

The CSL-LMs 56 and 58 of the respective computer systems #0 30 and #1 32 are connected to each other via an internal bus 68, and the CSL-Is 60 and 62 are connected to each other via a control line 63. The ALM 79 and CSL-I 60 are connected to each other via an L-BUS 55, and the ALM 81 and CSL-I 62 are connected to each other via an L-BUS 57. The individual computer systems are each referred to as the self system when viewed from itself, as the opposite system when viewed from the mate system and as the other system when viewed from a separate system. An address of the MU 34 (or 36) when viewed from software standpoint is referred to as a logic address, and is referred to as a physical address when viewed from hardware standpoint.

Now, the function of the CSL-LMs 56 and 58 when access is made to the MU will be described.

The case when the ACU in the self system, for instance the ACU 42 of the system 30 shown in FIG. 5, makes access to the MU in other system, for instance the MU 36, is different from the case when making access to the MU 34 in the self system in (1) addressing, (2) memory protection and (3) access through H-BUS.

In the instant embodiment, the MU in the other system is assumed to have a physical address space of 1 M to 16 M bytes when viewed from the ACU.

The CSL-LMs 56 and 58 each have a 1 M byte unit construction, and a one-to-one address correspondence relation is provided between each of them and the other system MU.

As the physical access (PA) here is referred to the address of the last operand produced from the ACU. This means that the effective logic address (EA) given by an instruction operand coincides with the physical address (PA) when the address space for the effective logic address (EA) is no greater than, for instance, 4 M bytes. If the effective logic address (EA) exceeds 4 M bytes, address modification according to the relocation register content is effected to determine the last operand address.

Figure 7:
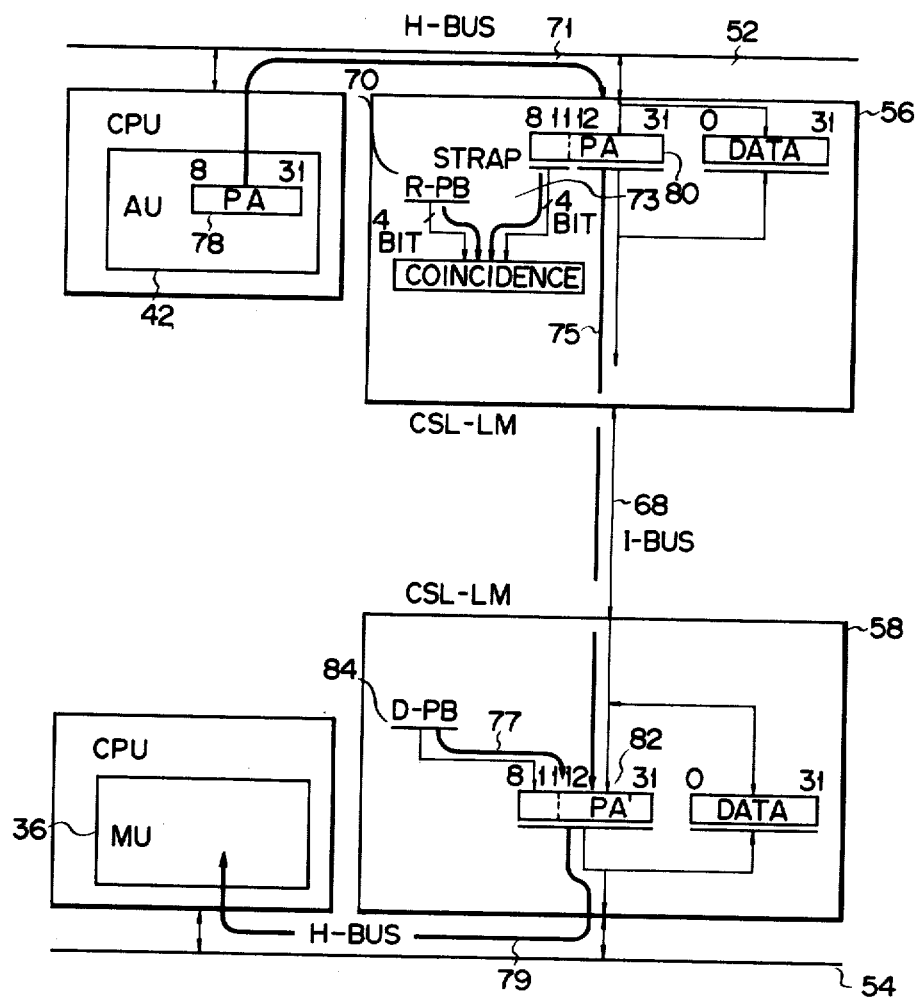
FIG. 7 is a block diagram showing an address generating section in the CSL-LM shown in FIG. 5.

An address space of 1 M bytes (i.e., 1 block) allocated to an interface module (CSL-LM/INT) is referred to as receive logic block (R-PB), and a 1 M byte address space allocated to the other system CSL-LM/INT is referred to as drive logic block (D-PB). The generation of this address space will now be described with reference to FIG. 7.

Now, the operation involved in the address generation when the ACU #0 42 (reference numeral 42) of the system #0 30 (reference numeral 30) makes access to the MU #1 36 (reference numeral 36) in the system #1 32 (reference numeral 32) will be described; the operation involved when the ACU #1 44 in the system #1 32 makes access to the MU #0 34 in the system #0 30 is the same, so its description is not given.

In the first place, the physical address stored in a physical address register 78 in the ACU #0 42 is transferred to a physical address register 80 to the CSL-LM 56 (route 71). The upper 4 bits (bit 8 through bit 11) of the physical address stored in the register 80 is compared with the address space set in the R-PB 70 (route 73). When the coincidence is detected, the remaining 20 bits (bit 12 through bit 31) of the physical address stored in the register 80 are transferred to a physical address register 82 in the other system CSL-LM #1 58 (routes 71, 73 and 75). In the other system CSL-LM #1 58, the upper 4 bits (bit 8 through bit 11) of physical address are supplied from the D-PB 84 to the register 82 to produce the 24-bit last address (route 79).

Figure 8:
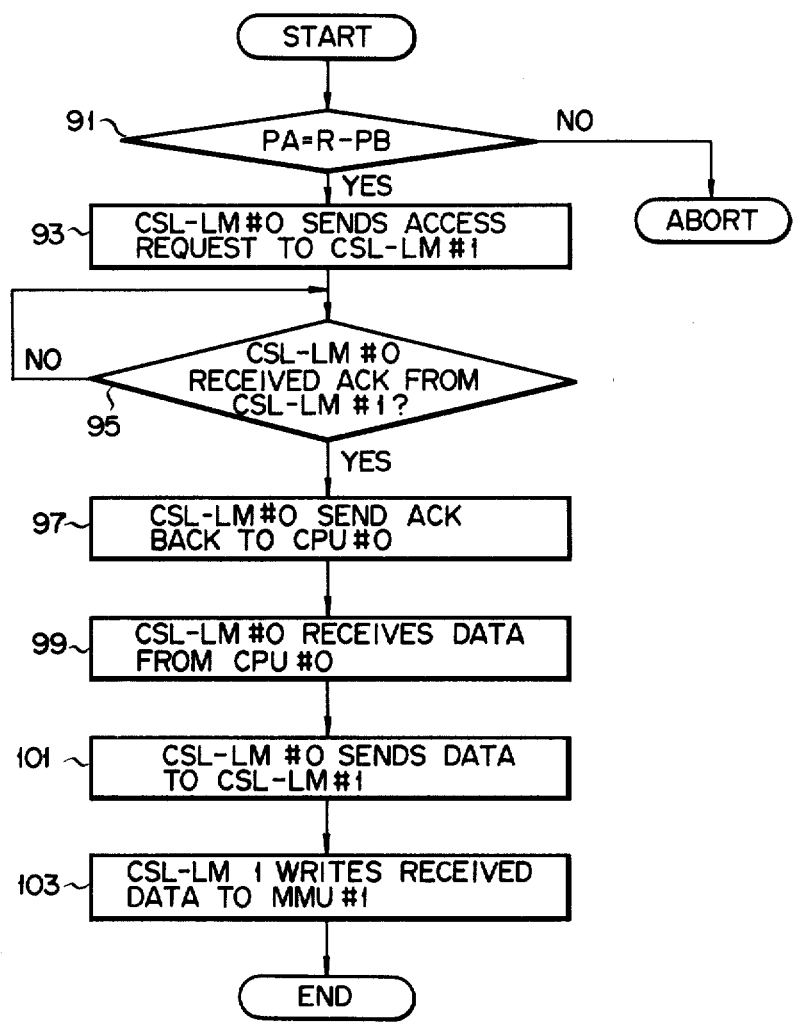
FIG. 8 is a flow chart illustrating the operation involved when data is written in the other system computer from the self system computer.

FIG. 8 shows a flow chart of the case when data is transferred from the self system, for instance system #0 30, to the other system, for instance system #1 32, for writing the data therein.

In this case, whether the physical address coincides with the receive logic block (R-PB) is checked (step 91). Then, the CSL-LM #0 56 sends an access request to the CSL-LM #1 58 (step 93). When the CSL-LM #0 56 receives the ACK signal from the CSL-LM #1 58, it sends the ACK signal back to the CPU #0 30 (steps 95, 97). The CSL-LM #0 56 receives data from the CPU #0 30 and sends it to the CSL-LM #1 58 (steps 99, 101). Then, the CSL-LM #1 58 writes the received data to the MU #1 36.

Figure 9:
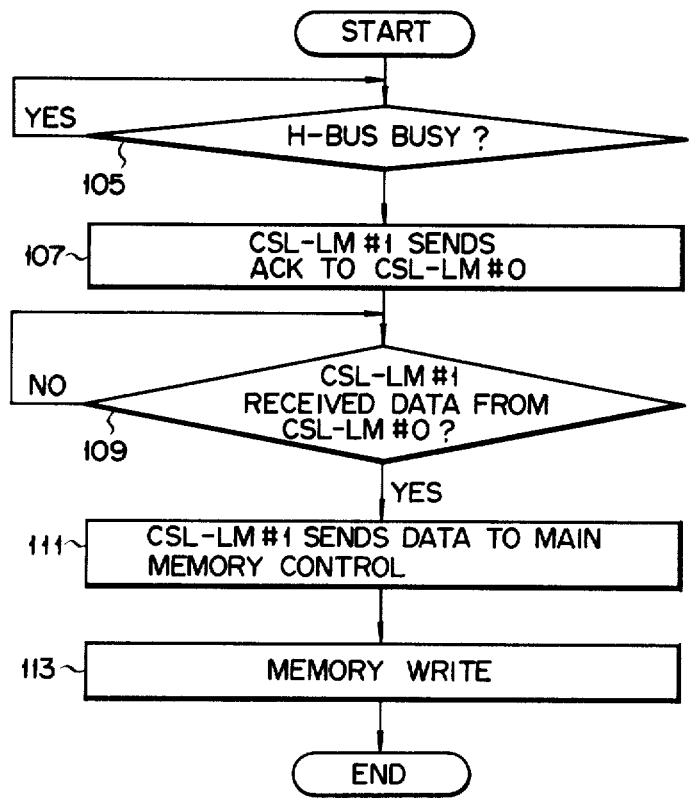
FIG. 9 is a flow chart illustrating the operation of the computer in which data is written.

FIG. 9 shows a flow chart of the operation in the opposite side computer #1 32. First, whether the H-BUS 54 is busy or not is checked and, if it is not busy, the CSL-LM #1 58 sends the ACK signal back to the CSL-LM #0 56 (steps 105 and 107). When the CSL-LM #1 58 receives data from the CSL-LM #0 56, it sends data to a main memory control section 46 (FIG. 6), whereby writing in the MU #1 36 is effected (steps 111 and 113).

Now, the access procedure will be described in detail with reference to FIGS. 10 through 12.

Figure 10:
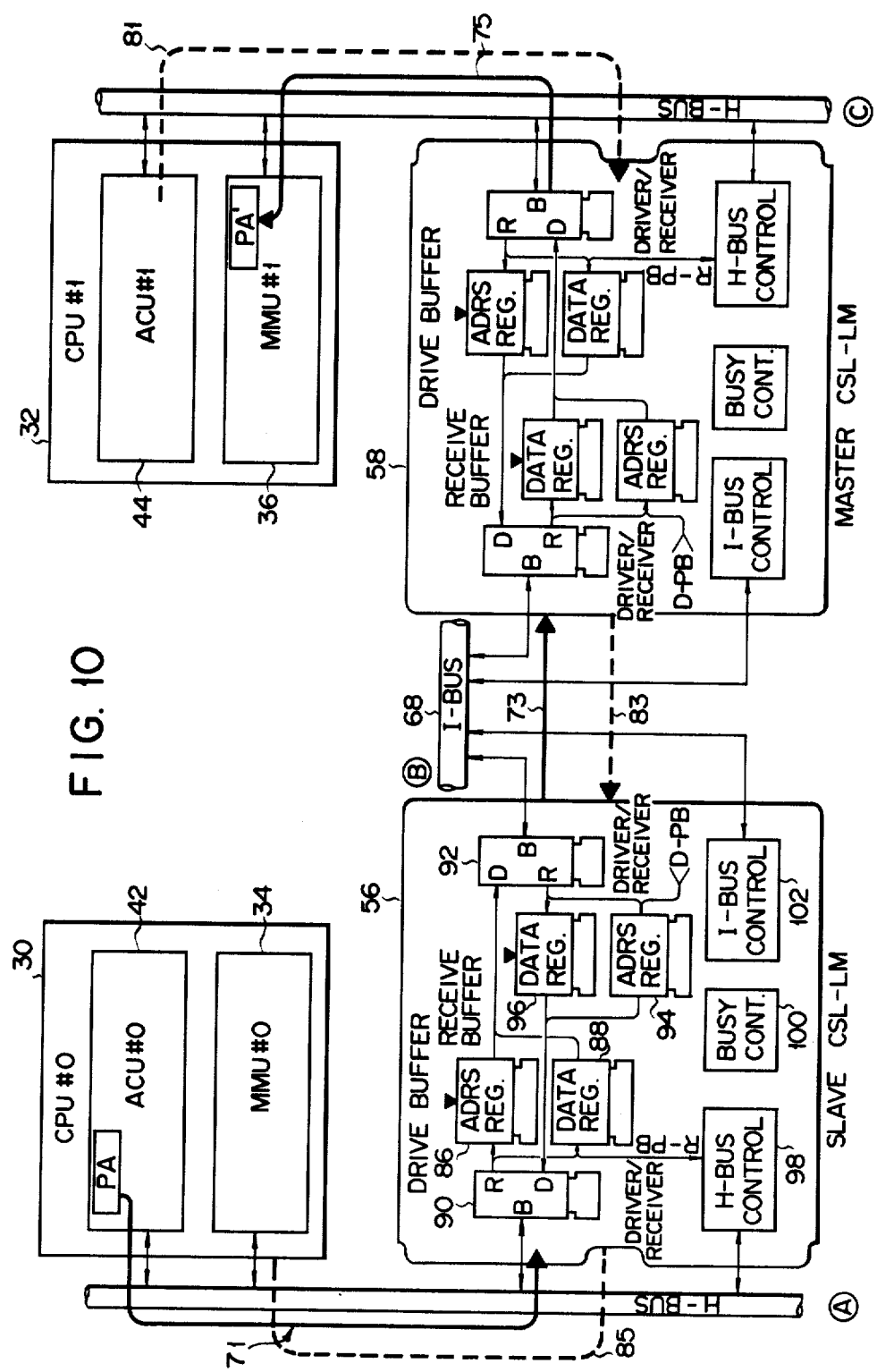
FIG. 10 is a block diagram showing in detail the access route when the CSL-LM shown in FIG. 5 makes access to the other system MU.

In FIG. 10, the solid line indicates the route, through which the CPU #0 30 makes access to the MU #1 36 in the CPU #1 32, and the dashed line indicates the route, through which the CPU #1 32 makes access to the MU #0 34 in the CPU #0 30.

The slave CSL-LM #0 56 includes a drive buffer, which is constituted by a sending side driver/receiver 90, an address register 86 and a data register 88, and a receiver buffer, which is constituted by a receiving side driver/receiver 92, an address register 94 and a data register 96. As the driver/receivers 90 and 92 may be used, for instance, DS 8642 quad transceiver of National Semiconductor Corp. The CSL-LM #0 56 further includes an H-BUS control circuit 98 for controlling the H-BUS 52, an I-BUS control circuit 102 for controlling the I-BUS 68 and a BUSY control circuit 100.

The CSL-LM #1 58 in the CPU #1 32 has the same construction.

In the CSL-LM the following high bus interface signals are used.

CSCLR0 (System Clear)

A system clear signal, which is produced when an initialization switch among CPU control switches on a display panel of the CPU is depressed or when the CPU is disconnected from power supply.

CTASH0 (Test and Set H-BUS)

This signal is a mode signal for causing the MU 34 or 36 to execute a Test and Set cycle.

CWRTH0 (Memory Write H-BUS)

This is a mode signal for causing the execution of writing in the MU.

CHWOH0 (Half Word H-BUS)

This signal indicates that the relevant data is a half word.

CMREF0 (Memory Reference)

A signal for requesting data transfer to the MU.

CACPT0 (Accept)

This signal is a response signal to the CMREF0.

CWAIT0 (Wait)

This signal is a response signal to the CMREF0, and it has an effect of causing a request to be sent again after 2 μsec, for instance.

CDATA0 (Data Available)

This signal shows an effective timing of the BUS information for transferring data.

CSYNH0 (Synchronous H-BUS)

This signal is a response signal for the CDATA0 signal.

CATNB0 (Attention BUS)

This signal is a request signal for obtaining the BUS.

CACKB0 (Acknowledge BUS)

This signal is a response signal for the CATNB0 signal.

CBSTL0 (Bus Stall)

This signal is sent out when the bus occupation (CBBSY0) period exceeds a prescribed value.

CBTPE0 (Bus Transmission Parity Error)

This signal is produced in synchronism to the CACPT0 or CSYNH0 when the data sent out to the data line has a parity error.

For the control of the I-BUS there are following signals.

A signal for a request for obtaining the I-BUS (I-BUS REQUEST), which is reset when the request is accepted. There are two signals as this signal, namely CIREQ0 ... A signal for enabling the slave CSL-LM.
FIREQ0 ... A signal for an internal request in the master CSL-LM.

An I-BUS enable signal I-BUS (I-BUS ENABLE), which informs the relevant CSL-LM of the fact that the I-BUS is enabled. There are two signals as this signal, namely CIENL0A ... A signal for enabling the CSL-LM.
CENL10 ... An internal enable signal in the master CSL-LM.

An I-BUS drive end signal (DRIVE END), which informs the opposite system CSL-LM of the fact that the use of the I-BUS is ended. There are two signals as this signal, namely CDEND0A ... A signal which is produced when the slave CSL-LM informs the master CSL-LM of the end.
CDEND0B ... A signal which is produced when the master CSL-LM informs the slave CSL-LM of the end.

An I-BUS information signal (BIDIRECTIONAL-BUS), which is a bidirectional bus carrying address information, function information and data information. There are two signals as this signal, namely DBB000-310 ... A 32-bit information line.
DBEP00-30 ... An information line parity bit signal on an 8-bit unit.

Figure 11A:
FIGS. 11A and 11B show a format of the assignment of bits of the I-BUS shown in FIG. 5.
Figure 11B:
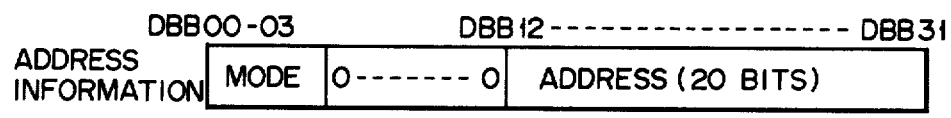

The bit assignment of the 32-bit bus is as shown in FIGS. 11A and 11B.

The correspondence between the I-BUS mode information and H-BUS mode information is as follows.

| I-BUS | H-BUS |
|---|---|
| DBB000 | CHWDH0 |
| DBB010 | CWRTH0 |
| DBB020 | CFUNH0 |
| DBB030 | CTASH0 |

As I-BUS gate signal for the control as to whether address information or data information is to be provided for the DBB00-DBB31, there are two signals, namely CADRG0 ... A gate signal for providing address information. It is an internal signal and is not output to the I-BUS cable.
CDATG0 ... A gate signal for providing data information. It is an internal signal not output to the I-BUS cable.

I-BUS strobe signals which permit the address information and data information in the DBB00-DBB31 to be latched in the opposite system side are as follows.

CDARS0A ... A signal which permits the address information to be latched in the master CSL-LM.
CDRAS0B ... A signal which permits the address information to be latched in the slave CSL-LM.
CDATD0A ... A signal which permits the data information to be latched in the master CSL-LM.
CDATD0B ... A signal which permits the data information to be latched in the slave CSL-LM.

Figure 12:
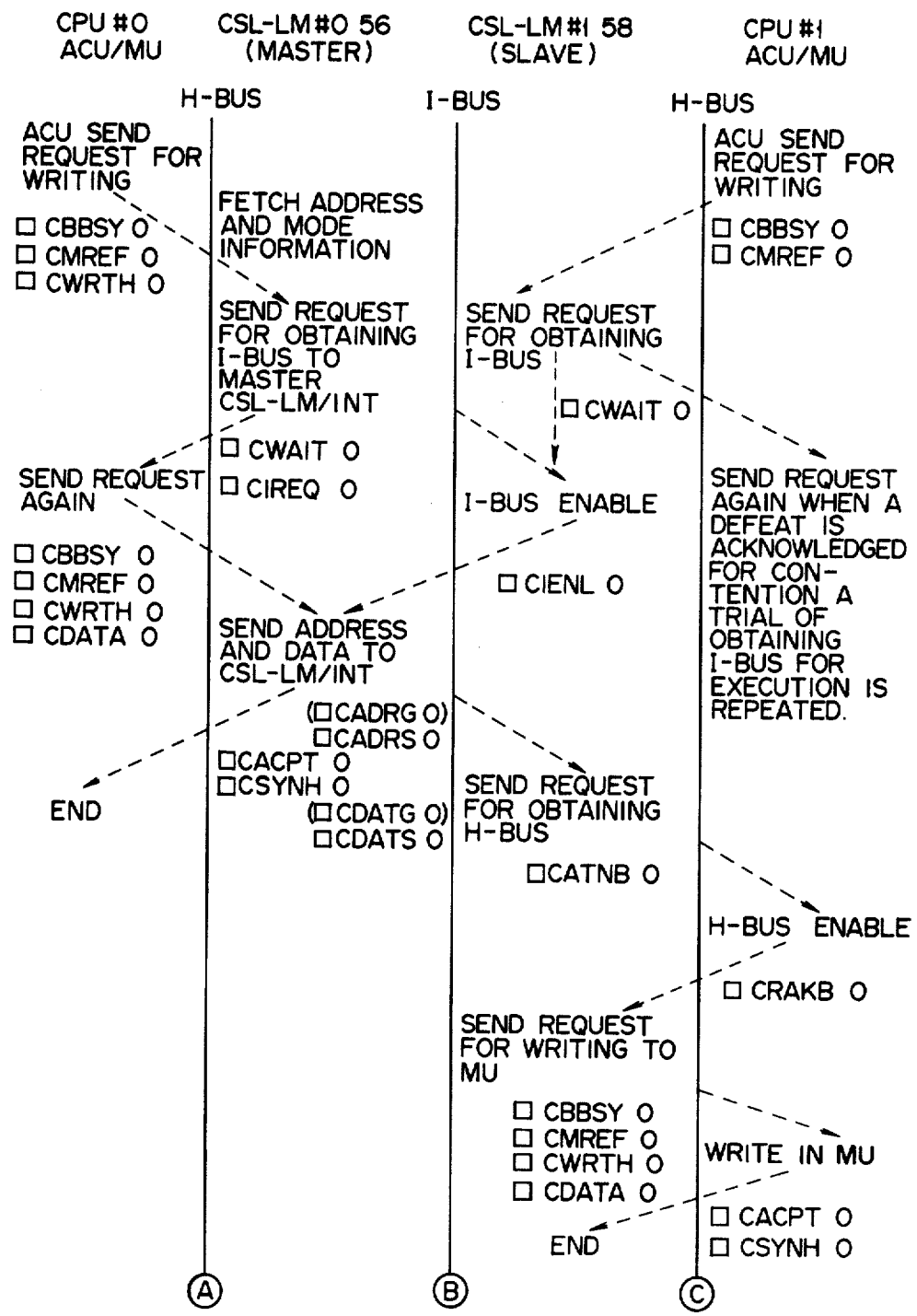
FIG. 12 is a flow chart illustrating the access procedure in writing cycle of each of the ACUs #0 and #1 shown in FIG. 5.

FIG. 12 shows the procedure of making access for writing cycle. In this example, the CSL-LM #0 56 is assumed to be the slave CSL-LM, and the CSL-LM #1 58 is assumed to be master CSL-LM.

The ACU #0 42 first sends out the CBBSY0, CMREF0 and CWRTH0 signals as a request for writing to the slave CSL-LM 56. The slave CSL-LM 56 fetches address and mode information and sends the CWAIT0 (wait request) signal back to the ACU #0 42 to let the ACU #0 42 wait. At the same time, it sends out the CIREQ0 (I-BUS request) signal to the master CSL-LM 58. When this request is received, the CIENL0 (I-BUS enable) signal is returned from the master CSL-LM. When the slave CSL-LM receives the CIENL0 signal, with the writing request signals CBBSY0, CMREF0 and CWRTH0 sent out again from the ACU #0 42 2 μsec afterwards it accepts the request by returning the CACPT0 signal to the ACU #0 42.

Subsequently, the ACU #0 42 sends out the CDATA0 signal and data for writing to the slave CSL-LM, which then receives the data and sends the CSYNH0 signal back to the ACU #0 42.

The ACU #0 42 produces address and data. The slave CSL-LM sends address to the master CSL-LM through the I-BUS at the timing of the CADRG0. The master CSL-LM receives the data under the control of the strobe signal CADRS0.

When the master CSL-LM 58 ends the fetching, it sends out a request for obtaining the H-BUS as the CATNB0 signal to the MU 36.

The H-BUS controller produces an H-BUS enable signal CRAKB0.

When the master CSL-LM 58 fetches this signal, it sends out a request for writing as the signals CBBSY0, CMREF0 and CWRTH0 to the MU 36, which then sends back the signal CACPT0. The master CSL-LM 58 sends out the signal CDATA0 and data to the MU 36, and the MU 36, when receiving the data, sends back the signal CSYNH0 to complete the cycle.

Figure 13:
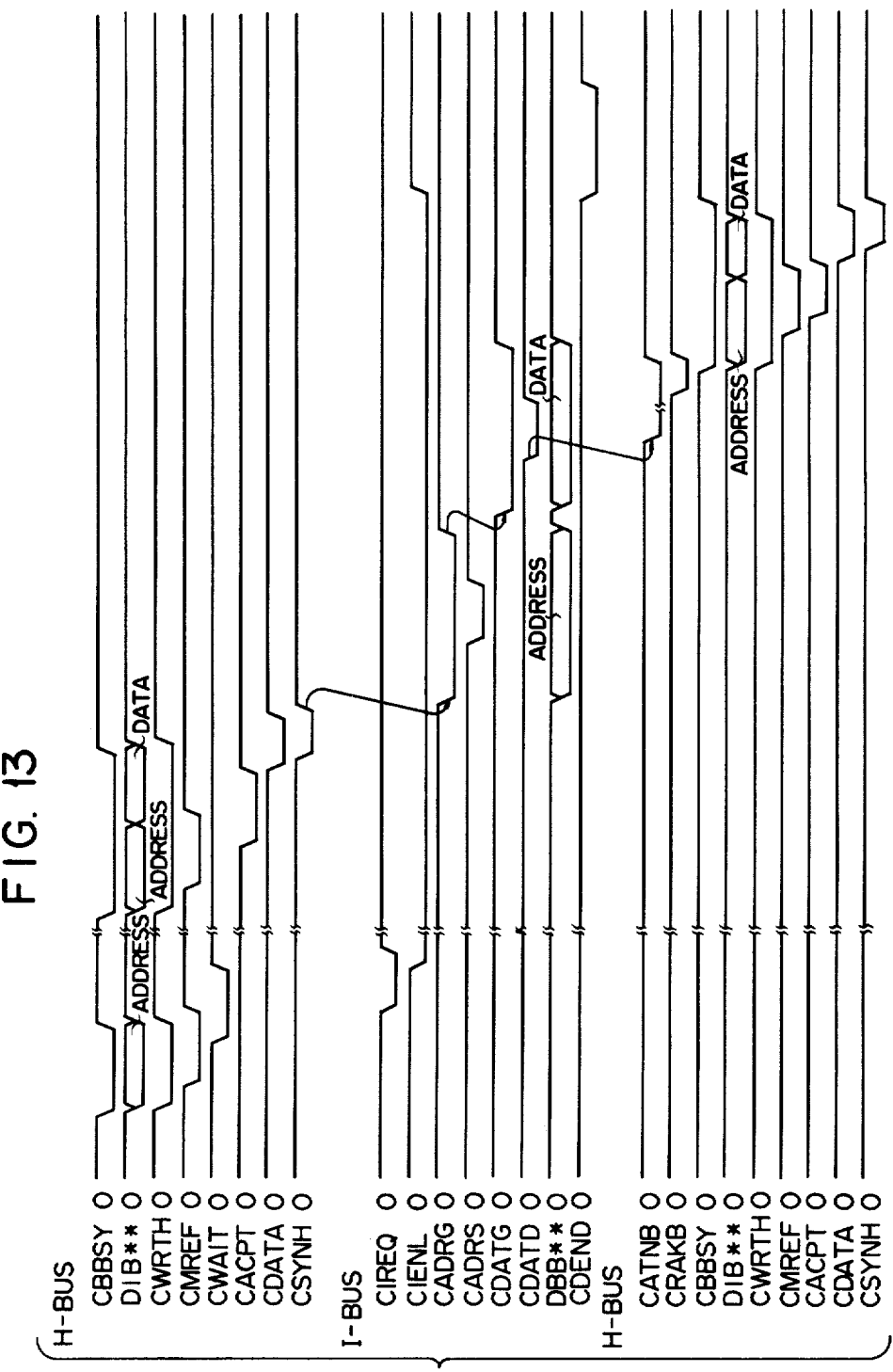
FIG. 13 is a timing chart showing control signals involved in the writing cycle.

The timings of the individual signals in the aforementioned writing cycle are as shown in FIGS. 13A through 13C.

Figure 14:
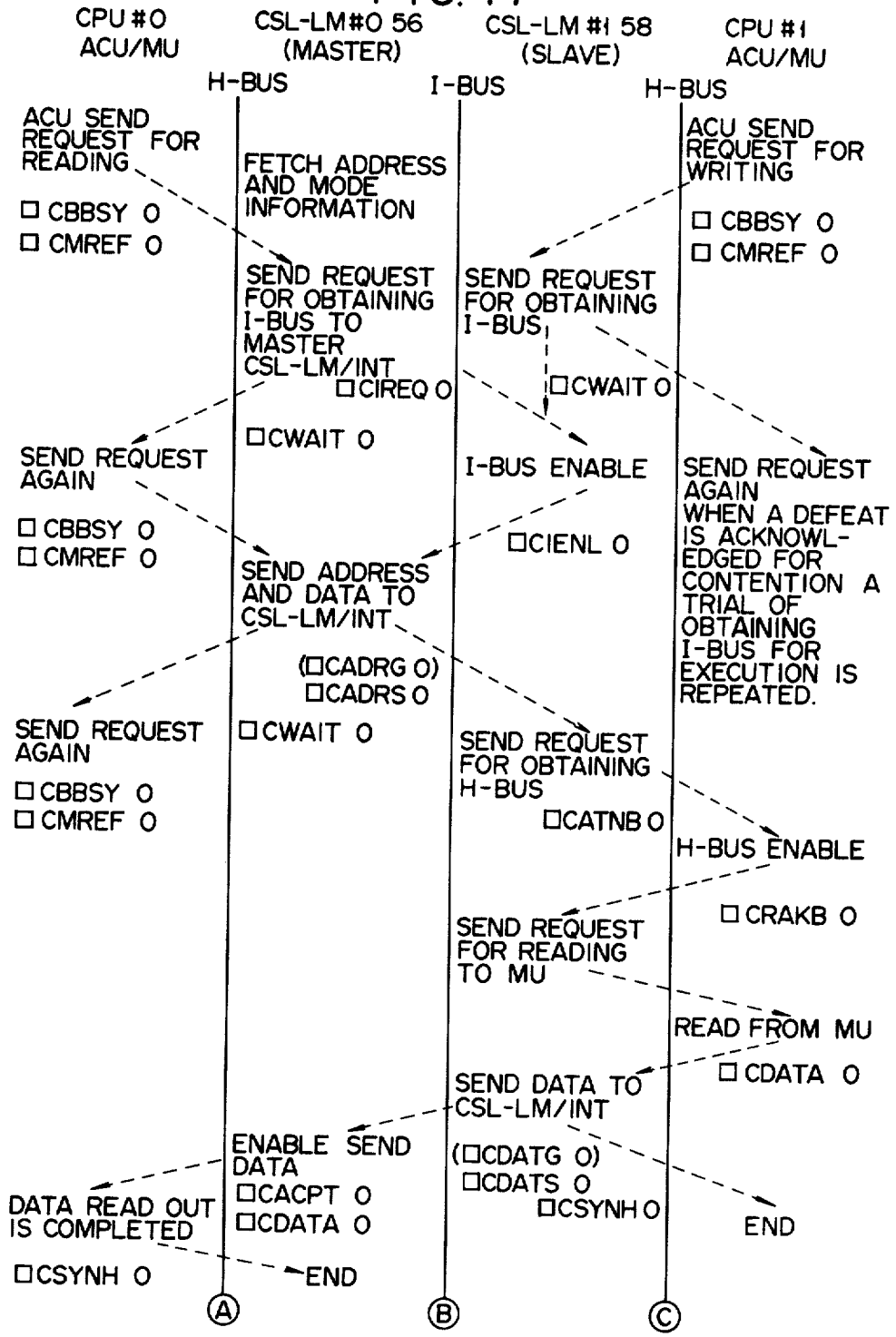
FIG. 14 is a flow chart illustrating the access procedure in reading cycle of each of the ACUs #0 and #1 shown in FIG. 5.

FIG. 14 shows the procedure of making access for reading cycle. The ACU #0 42 first sends out the signals CBBSY0, and CMREF0 as a request for writing to the master CSL-LM 56. The master CSL-LM 56 fetches address and mode information and sends the request wait signal CWAIT0 to the ACU #0 42 to let the ACU #0 42 wait.

At the same time, the master CSL-LM 56 sends out a request for obtaining the I-BUS (CIREQ0). When the request is accepted, the signal CIENL0 is sent back from the master CSL-LM 56.

The slave CSL-LM 58 in receipt of the enable signal CIENL0 sends address information and mode information to the master CSL-LM 56 at the timing of the strobe signal CADRG0. The ACU #0 42 sends back the wait request signal CWAIT0 again.

The slave CSL-LM 58 sends out a request for obtaining the H-BUS as the signal CATNB0. When the H-BUS controller receives this signal, it sends out the H-BUS enable signal CRAKB0.

When the slave CSL-LM 58 receives this H-BUS enable signal, it sends out a request for writing as the signals CBBSY0 and CMREF0 to the MU 36. The MU 36 sends back the signal CDATA0 and at the same time it reads out data from the relevant address and sends it together with the signal CDATA0. When the slave CSL-LM 58 receives this signal, it sends the signal CSYNH0 back to the MU 36 to complete the H-BUS cycle.

Figure 15:
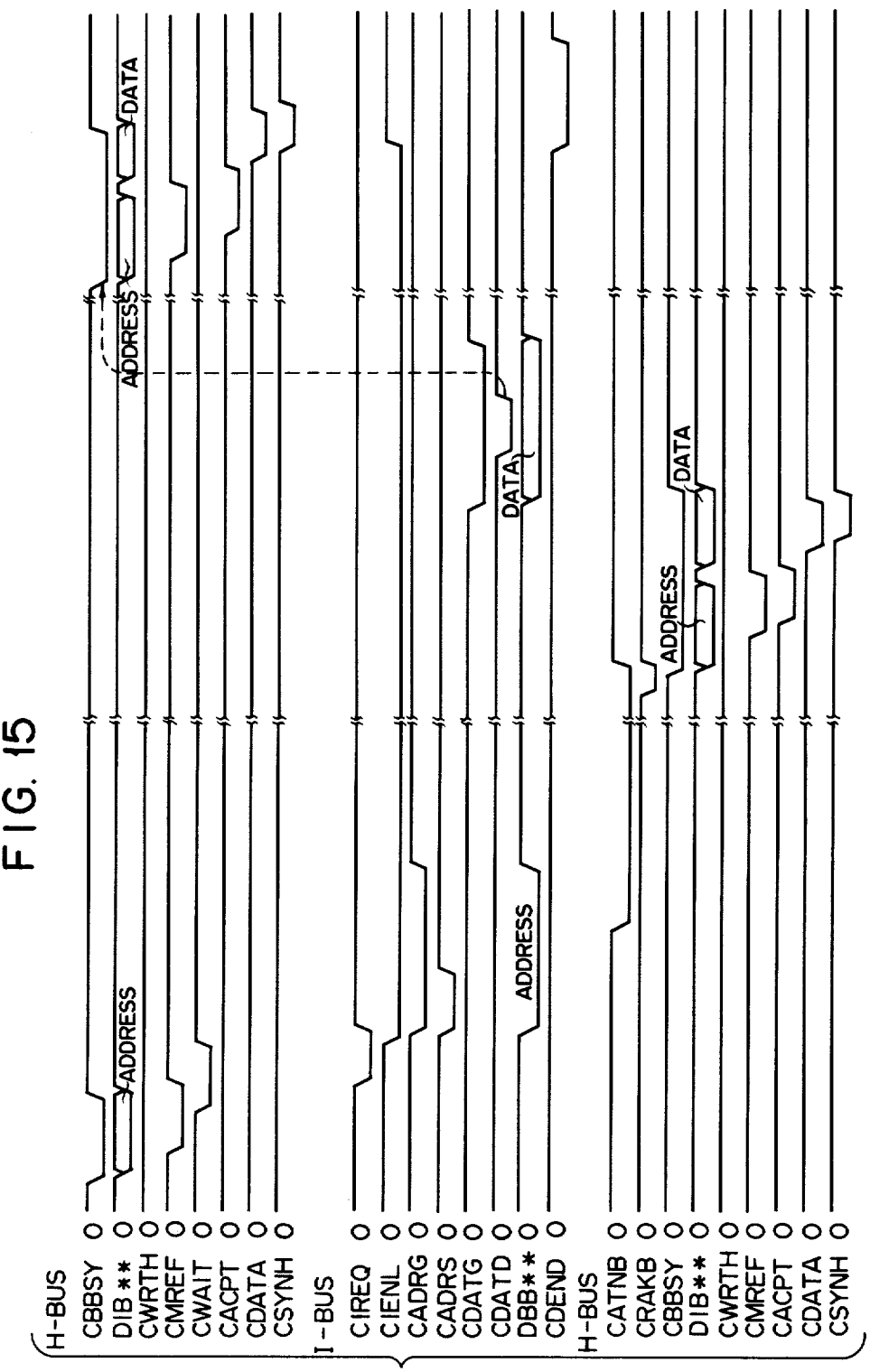
FIG. 15 is a timing chart showing control signals involved in the reading cycle.

When the slave CSL-LM 58 receives data, it sends out data to the master CSL-LM 56 which is now requesting the writing at the timing of the signal DATAG0, and also it sends out the strobe signal CDATS0. When the master CSL-LM 56 receives the data, with the reading request signals CBBSY0 and CMREF0 sent out again from the ACU #0 42 2 μsec afterwards, it sends back the signal CACPT0, at the same time it sends out the signal CDATA0 and data. When the ACU #0 42 receives the data, it sends the signal CSYNH0 back to the master CSL-LM 56. The timings of the individual signals in the aforementioned reading cycle are as shown in FIGS. 15A through 15C.

Figure 16:
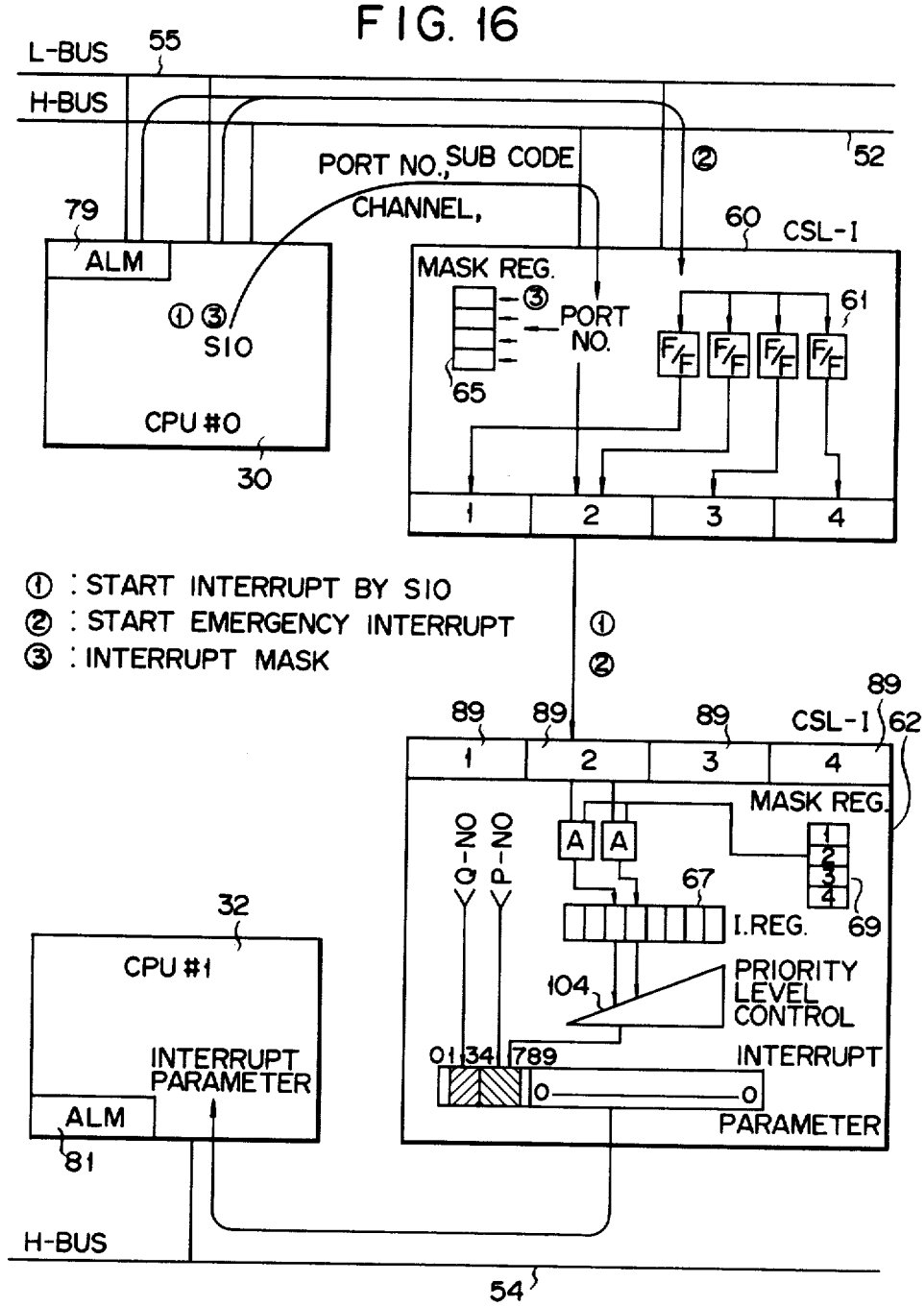
FIG. 16 is a detailed block diagram of the CSL-I shown in FIG. 5.

FIG. 16 is a block diagram showing the CSL-Is 60 and 62 in a greater detail.

Now, the description will be made in connection with the start of interruption by an input/output start (hereinafter referred to as SIO) instruction, start of emergency interruption and masking of interruption in the mentioned order.

To cause an interruption by an SIO instruction, a subcode thereof is set to "1", whereby channel No. data, port No. data and subcode are sent to the H-BUS. The CSL-I in question, for instance the CSL-I 60, fetches the port No. data and renders active the interruption request signal of the specified port.

When the CSL-I 62 of the other system receives the interruption request signal, it sets the corresponding flip-flop in an interruption register 67 when the interruption of the specified port is enabled. The outputs of the flip-flops of the interrupting register 67 are transferred to an H-BUS interrupt interface circuit according to their priority levels determined by a priority level control circuit 104, whereby an H-BUS interruption is produced. When an interrupt approval signal from the CPU #0 30 arrives, an interrupt parameter is transferred to the CPU #0 30. When an alarm signal from an alarm output module is rendered active or when the power-off state and initialization state of the self system are brought about, an emergency interrupt request signal is sent to the other system CSL-I 62. The operation of the other system CSL-I 62 that has received the emergency interrupt request signal is the same interruption caused by the SIO instruction except for that the bit 8 of the interrupt parameter is set. In the case of the masking of interruption, the channel No. and port No. data and subcode are sent to the H-BUS by the action of an interrupt mask (i.e., subcode No. 2 of the SIO). The CSL-I 60 in question fetches the interrupt mask port No. sent to it and holds the data in a mask register 65.

If the interrupt mask register 65 is already set, the interrupt request signal (either by SIO or emergency interrupt) is set in an interrupt register 67. If the mask register 65 is reset, the aforementioned interrupt request is not set in the interrupt register 67.

Figure 17A:
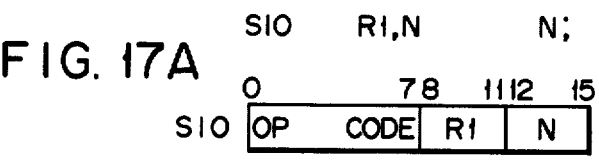
FIGS. 17A through 17C show a format of the start input/output (SIO) instruction.
Figure 17B:
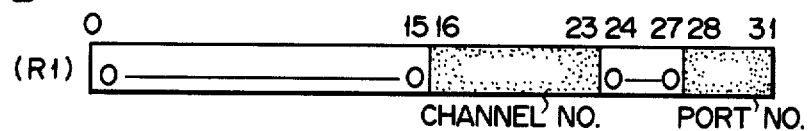
Figure 17C:
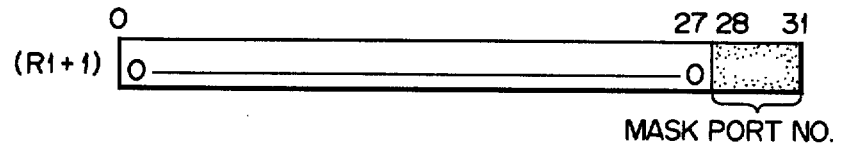

FIGS. 17A through 17C show the format of the SIO instruction with respect to the CSL-I. As shown in FIG. 17A, to the OP CODE of the SIO instruction are assigned bit 0 through bit 7, bit 8 through bit 11 specify the No. of (32-bit) general register in which $R_1$ field is stored, and to the subcode No. are assigned bit 12 through bit 15. In the $R_1$ field, as shown in FIG. 17B, bit 16 through bit 23 specify the channel No., and bit 28 through bit 31 specify the port No. In the general register next to the selected one, bit 28 through bit 31 are assigned to the mask port No., as shown in FIG. 17C. The subcode represents the interrupt start when its content is N=1 and represents the interrupt mask when its content is N=2.

Figure 18:
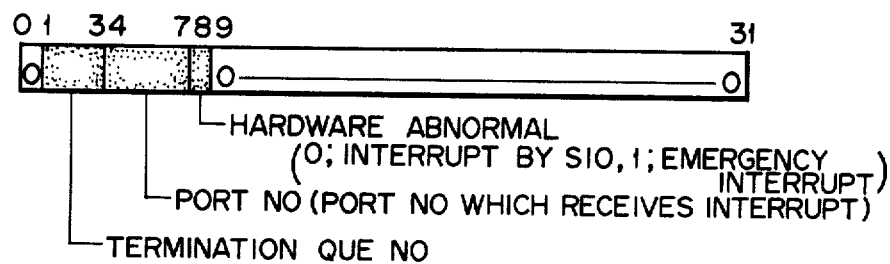
FIG. 18 shows a format of interrupt parameters.

FIG. 18 shows the interrupt parameter. The CSL-I gives an interrupt from the other system as termination interrupt to the CPU and sends interrupt parameter of the FIG. 18 format to the H-BUS. In FIG. 18, the termination que. No. (the value of Q-No in FIG. 14) is assigned to bit 1 through bit 3, the port No. (at which an interrupt is received) is assigned to bit 4 through bit 7, and bit 8 is for hardware abnormal ("0" being in the case of interrupt by SIO and "1" being in the case of emergency interrupt).

Figure 19:
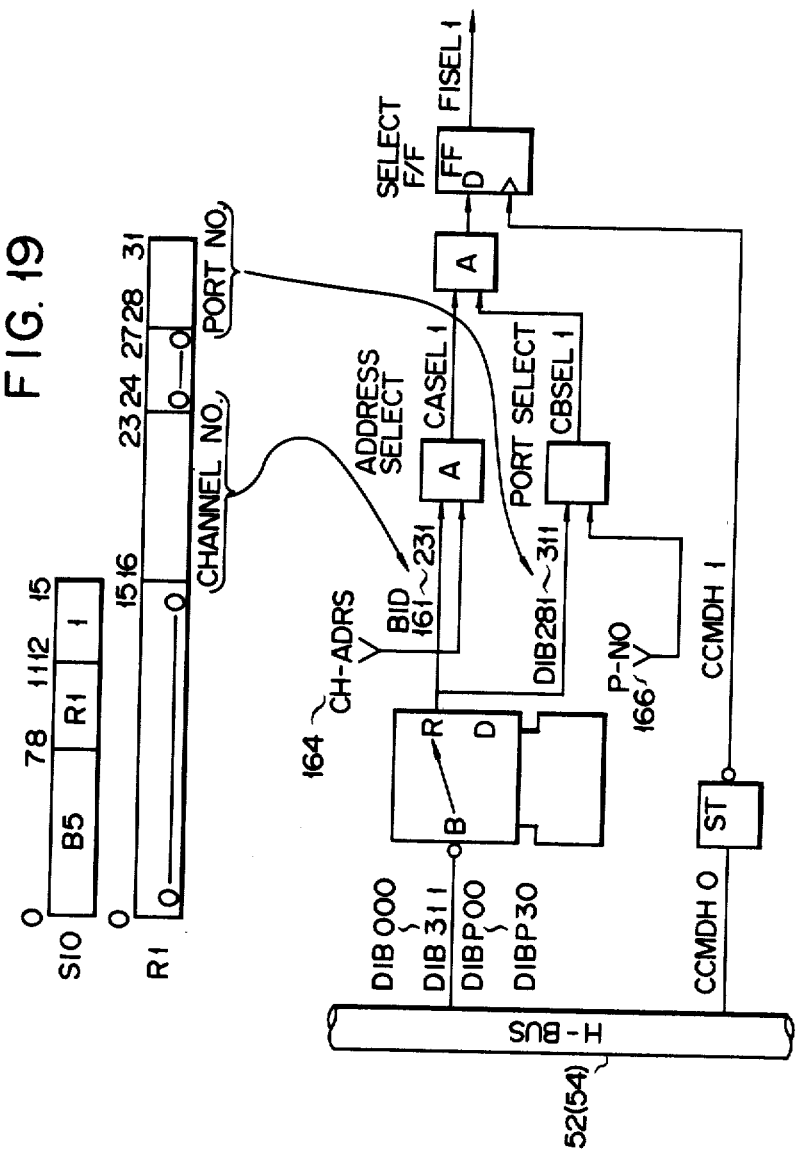
FIG. 19 is a view showing the process through which the CSL-I is selected in an interrupt operation caused by the SIO instruction shown in FIGS. 17A through 17C and FIG. 18.

Now, the interrupt by the SIO instruction will be described with reference to FIG. 19. The interrupt by the SIO instruction is started by the selection of CSL-I according to the channel No. and port No. in the SIO instruction $R_1$ field content. The channel No. is compared with the channel address (CH-ADRS), and the port is selected by a port specification No. (P-No) 166.

When the CSL-I receives an interrupt signal from the other system, it sends it after pulse shaping to the mask register 69. If the port 89 to which the interrupt is given is in the enabled state, the interrupt is set in an interrupt register 67 in that port 89. With the setting of the interrupt register 67, the CINTR signal is produced and shifted to the priority level control circuit 104 for detecting the emergency interrupt. As a result, the port No. is determined by a port encoder (not shown) according to the priority level. Further, a termination request is sent to the CPU, and an interrupt parameter is produced from the Q-NO, port No. and whether or not an emergency interrupt is present and is fed to the H-BUS. The interrupt process is completed with the return of a response signal from the CPU.

Figure 20:
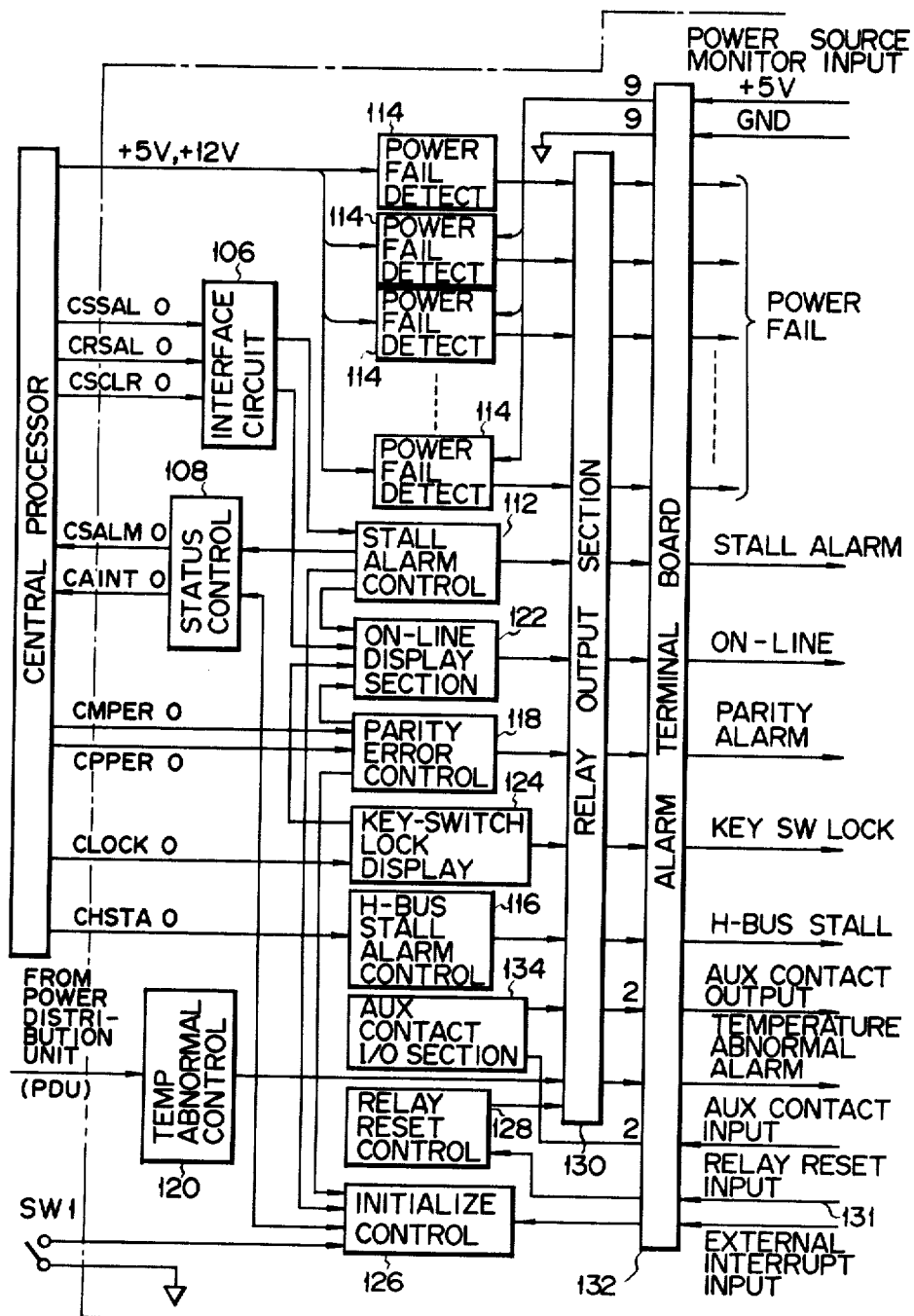
FIG. 20 is a block diagram showing an alarm unit (ALM) shown in FIG. 5.
Figure 22A:
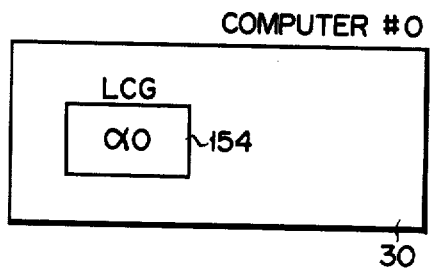
FIGS. 22A through 22D and 23A through 23D are views illustrating the way of restoration of shared information at the time of the system-down of the computer complex.
Figure 22B:
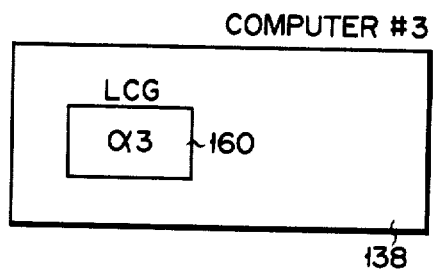
Figure 22C:
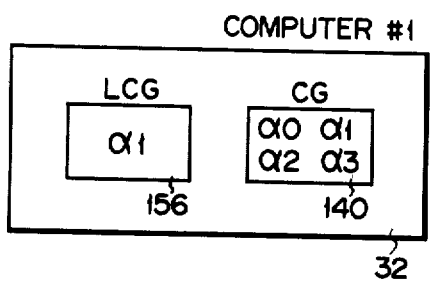
Figure 22D:
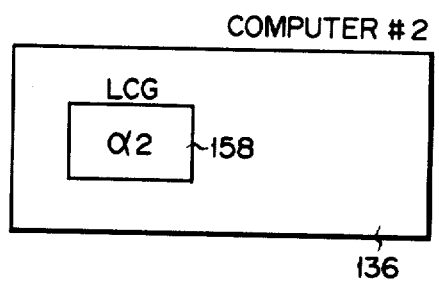
Figure 23A:
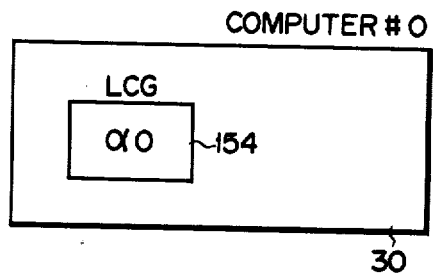
Figure 23B:
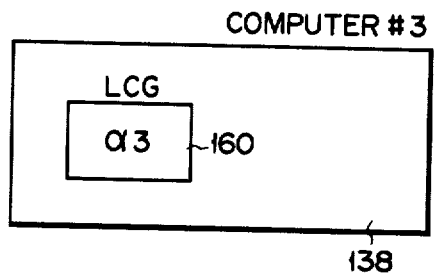
Figure 23C:
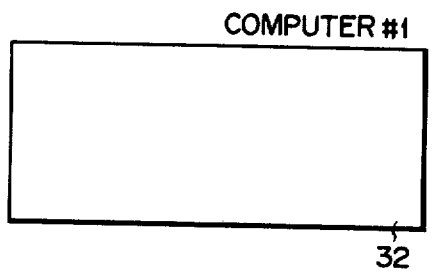
Figure 23D:
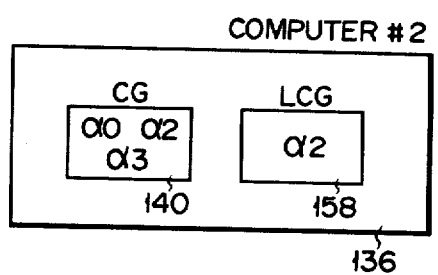

FIG. 20 shows a detailed block diagram of the alarm unit 64 (or 66).

It includes an interface circuit 106 for sending and receiving signals with respect to the CPU, a status control section 108, an abnormal temperature control section 120, a stall alarm control section 112 using an integrating circuit, power fail detection circuits 114 for monitoring the DC output voltage of power supply, an H-BUS stall alarm signal control section 116, a parity error control section 118, an on-line display section 122 for displaying the status of the system, a key-switch lock display section 124 for displaying the console panel key-switch state, an initialize control section 126 for sending an initialize signal to the CPU, a relay reset control section 128 for resetting all latch type relays, an auxiliary contact I/O section 134, a relay output section 130 for sending alarms to the outside, and an alarm terminal board 132 connected to external units.

The stall alarm control section 112 checks that the CPU is normally operating for program execution. When its timer section (not shown) is triggered by a periodic trigger command from the CPU, the normal operation thereof is confirmed, and as soon as the periodic trigger command fails to appear it produces an alarm. The power failure detection section 114 is constituted by a plurality of independent sections, each of which monitors a corresponding power supply DC output. The individual sections produce DC power failure outputs as parallel outputs. The H-BUS stall alarm control section 116 is a controller for receiving an H-BUS stall signal, which is produced from an H-BUS stall checking circuit in the CPU, and sending out a failure signal when it receives the stall signal. The parity error control section 118 is a controller for producing a failure signal by receiving a parity error signal produced as a result of checking in a parity error check circuit in the CPU. In the parity error check circuit in the CPU, memory parity error, H-BUS parity error and L-BUS parity error are checked for, and when an error is detected, an OR output signal produced from the individual error check signals and the memory parity error signal are sent to the parity error control section 118. The abnormal temperature control section 120 sends out an output signal when it receives an abnormal temperature signal transmitted through a power distributor unit in a console with an abnormal temperature rise occurs inside the console, inside the power supply or inside the chassis. The on-line display section 122 is a display controller for permitting "ON-LINE" to be displayed during the program execution and "OFF-LINE" to be displayed at the time of generation of alarm and while the system is cleared. The "ON-LINE" condition is met when a start command is produced in the locked state of console key-switch. The "OFF-LINE" condition is met while the system is cleared, at the time of generation of a stall alarm and at the time of generation of a memory parity error. The key-switch lock display section 124 displays the console panel key-switch state and produces an output when the key-switch is in the locked state. The initialize control section 126 is a controller for producing an initialize signal to the CPU, and it has a function of permitting initialization from the external unit (external initialize function) and an internal initialize function of producing an initialize signal at the time of generation of an alarm. The relay reset control section 128 is a controller for resetting all latch type relays. When an external switch connected to a relay reset input terminal 131 of the alarm terminal board 132 is closed, it resets all the latch type relays. The relay output section 130 is constituted by relays for producing signals for sending out alarms. When each alarm signal is received, a latch relay and a momentary relay are turned "on", and output signal is sent out through the alarm terminal board 132 to the outside. The alarm terminal board 132 has a role of coupling signals between the relay output section 130 and external units.

Now, the operation of the above construction of the embodiment of the invention will be described.

The operations that take place can be roughly classed into two kinds, namely one in case when the CSL-LM 56 (or 58) makes access to the opposite system main memory and one in case when the CSL-I 60 (or 62) transmits an interrupt to the opposite system CPU.

When a request to make access to the MU 36 in the computer system #1 32 is produced by the program in the system #0 30, conversion of logic address to physical address is effected in the LA/PA conversion unit 48 of the self system ACU #0 42. The access request by this physical address is sent to the self system H-BUS 52. The self system CSL-LM #0 56 detects that the access request sent to the self system H-BUS 52 is one directed to the MU 36 in the opposite system #1 32, and it transmits this access request to the CSL-LM #1 58 in the opposite system. The opposite system CSL-LM #1 58 receives the access request and reads out from the MU #1 36. The data read out from the MU #1 36 is supplied through the ACU 44, H-BUS 54, CSL-LM #1 58 and I-BUS 68 to the CSL-LM #0 56. The CSL-LM #0 56 supplies the received data to the ACU #0 42 to complete the access to the opposite system MU.

As the interruption by the CSL-I to the opposite system ACU there are one by a program and one for transmitting computer failure detection information. The interruption of program, for instance from the computer #0 30 to the computer #1 32, is effected under the control of the SIO instruction as shown in FIGS. 15A through 15C.

More particularly, the SIO instruction mentioned above is supplied to the CSL-I #0 60. The CSL-I #0 60 fetches the port No., and renders the interrupt request signal for the specified port active. When the port to which the interrupt request is produced is in the enabled state, the other system CSL-I #1 62 in receipt of the interrupt request signal sets the corresponding flip-flop in the interrupt register 67. The output of this flip-flop is transmitted to the interrupt interface circuit for the H-BUS 54 according to the priority level determined by the priority level control circuit, whereby an interruption to the H-BUS 54 is produced. When an interrupt acknowledgement signal from the ACU #1 44 is received, an interrupt parameter as shown in FIG. 16 is transferred to the ACU #1 44.

An emergency interrupt request signal to the other system CSL-I #1 62 is produced when an alarm signal from an alarm output module, for instance the ALM #0 79, is rendered active or when a power failure or initialization state of the self system is produced. The operation of the other system CSL-I #1 62 in the receipt of the emergency interrupt request signal is the same as that for the interruption by the SIO instruction except for that a particular bit of the interrupt parameter is set, so it is not described here in detail.

Now, the sharing of common information at the main memory level in the computer complex will be described.

Figure 21:
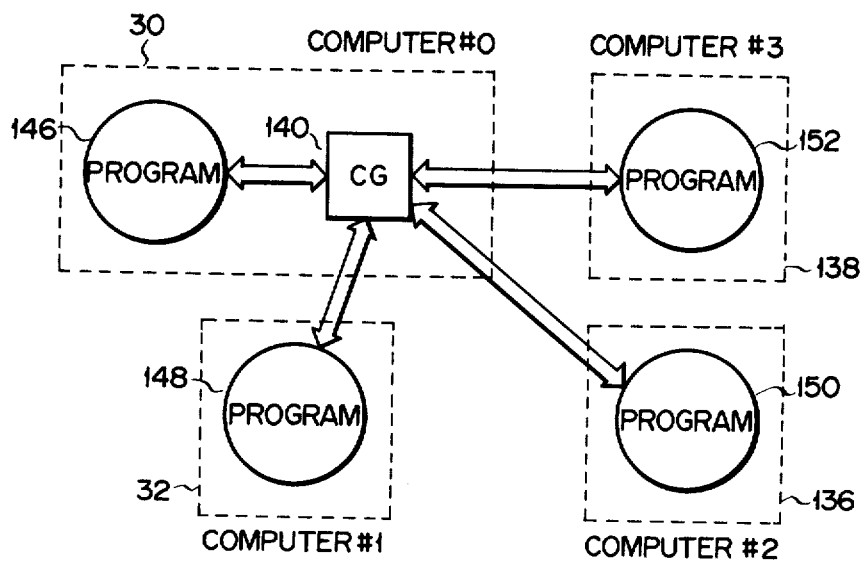
FIG. 21 is a block diagram for explaining the shared system for the shared information according to the invention.

As shown in FIG. 21, the common information is put in a computer complex global region (hereinafter referred to as CG) which is produced in the main memory of one of the computers. The access to the CG 140 from the programs 146, 148, 150 and 152 of the respective computers #0 30, #1 32, #2 142 and #3 144 is all made by the same logic address, which is converted by the LA/PA conversion section 48 to the physical address of the main memory of the computer where the CG 140 is present when viewed from each computer. If the CG 140 is present in the MU of the self system, it is made access to through the memory bus. If it is present in the MU of the other system MU, it is made access to from the H-BUS through the CSL-LM. Further, when the CG 140 is shifted from the MU of one computer to that of another computer, the value that is set in the LA/PA conversion section 48 is altered by a program so that it can be made access to always by the same logic address.

Now, the way of continuing the processing of the computer complex as a whole at the time of a problem occurring in a computer will be described by using the aforementioned CG 140. The "task" mentioned in the following description is a basic unit of execution in the computer processing and can include various resources (such as programs, main memory data and so forth).

There are the following two main problems when the processing of the computer complex as a whole is to be continued at the time of a computer trouble.

(a) Release of shared resources of the complex that have been possessed by the task in the computer in trouble.

(b) Release of the sound computer tasks of waiting for the release of the common resources of the task in the computer in trouble.

In case when the computer in trouble is one where the CG 140 is not present, the aforementioned (a) and (b) can be effected on the basis of the shared information that is retained in the CG 140.

In case when the computer in trouble is one where the CG 140 is present, it becomes impossible to make access to the shared information. Accordingly, in the instant embodiment at the time when the shared information is written in the CG 140 according to the program of each computer, the same information is also written in part of the self system MU (referred to as LCG), so that at the time of occurrence of trouble in the computer where the CG 140 is present the following measure is taken for continuing the processing of the computer complex as a whole.

(i) The CG 140 is shifted to the MU of a sound i.e. "healthy" computer.

(ii) Shared information excluding that relevant to the computer in trouble is reproduced on the CG 140 on the basis of the LCG of each sound computer.

(iii) Each sound computer task is released of waiting the release of shared resources on the basis of the reproduced shared information, and it is tried to let the shared resources be secured again.

By the step (iii), each sound computer task shared resources occupancy state and waiting state are reproduced. Since the information in the LCG in the computer in trouble is not contained in the reproduced shared information at this time, the aforementioned "release of shared resources of the complex that have been possessed by the task in the computer in trouble" is realized.

Also, in the step (iii), the "release of the sound computer tasks of waiting for the release of the shared resources of the task in the computer in trouble" is realized.

FIGS. 22A through 22D and 23A through 23D show an example of restoration of shared information. In the state of FIGS. 22A through 22D, shared data $a_0$ 154, $a_1$ 156, $a_2$ 158 and $a_3$ 160 set up by the computers #0 30, #1 32, #2 136 and #3 138 is present in the CG 140. When a trouble occurs in the computer #1 76 where the CG 140 has been established, the CG 140 is shifted to the different computer #2 136, and data $a_0$ 154, $a_2$ 158 and $a_3$ 160 of the computers #0 30, #2 136 and #3 138 are reproduced on the shifted CG 140, as shown in FIGS. 23A through 23D. On the basis of the reproduced CG 140, the tasks of the sound computers #0 30, #2 136 and #3 138 are released of waiting the release of shared resources, and it is tried to let the shared resources be secured again.

What we claim is:

1. A system for accessing shared information at a main memory level in a computer complex comprising a plurality of computers operatively coupled to one another for data processing, each computer having the capability of being either a host computer or a slave computer, at least one of the computers having a shared information storage region in its main memory means, each said computer comprising:

(a) main memory means for storing at least local data to be processed within said computer;
   (b) means, coupled to said main memory means, for controlling the reading of data therefrom and the writing of data therein;
   (c) arithmetic control means, coupled to said main memory control means, for controlling data processing operations involving said local data;
   (d) computer system linkage memory means, coupled to said main memory controlling means, for enabling access to said main memory means of all other computers through their corresponding computer system linkage interrupt means at a machine word level, thereby permitting the writing of shared information stored in the main memory means of the one of said computers into said main memory means of all other computers;
   (e) alarm means, coupled to said arithmetic control means, for detecting a problem in said arithmetic control means;
   (f) computer system linkage interrupt means, coupled to said arithmetic control means and alarm means, for transmitting an interrupt instruction to said arithmetic control means of all the other computers through their corresponding computer system linkage interrupt means in accordance with a command from said computer system linkage memory means or said alarm means;
   (g) high speed input/output bus means for connecting said computer system linkage memory and said computer system linkage interrupt means; and
   (h) means operatively connected to said arithmetic control means for altering one section of a logic address space viewed from each said computer to any one of a plurality of sections of a physical address space so that the logic addresses of the shared information storage region which are respectively viewed from the programs of said computers are identical.

2. A system according to claim 1, wherein the individual computers constituting said computer complex are connected to one another through buses, said buses being capable of being increased in number to accommodate additional computers.

3. A system according to claim 1 further including means for effecting the distribution and assignment of information to said individual computers at a task level.

4. A system according to claim 1, wherein said individual computers as elements of said computer complex are each independently capable of duty service data processing.

* * * * *